(12) United States Patent
Weber

(10) Patent No.: US 8,759,694 B2
(45) Date of Patent: Jun. 24, 2014

(54) APPARATUS AND METHOD FOR HANDLING PORTIONS OF FOOD PRODUCTS

(75) Inventor: Günther Weber, Groß Nemerow (DE)

(73) Assignee: Weber Maschinenbau GmbH Breidenbach (DE)

( * ) Notice: Subject to any disclaimer, the term of this patent is extended or adjusted under 35 U.S.C. 154(b) by 370 days.

(21) Appl. No.: 13/196,415

(22) Filed: Aug. 2, 2011

(65) Prior Publication Data

US 2012/0031682 A1 Feb. 9, 2012

(30) Foreign Application Priority Data

Aug. 5, 2010 (DE) .......................... 10 2010 033 526

(51) Int. Cl.
- B65B 1/46 (2006.01)
- B65B 25/06 (2006.01)
- B26D 7/30 (2006.01)

(52) U.S. Cl.
USPC ............. 177/52; 177/145; 177/119; 209/645; 209/942

(58) Field of Classification Search
USPC ................... 177/1, 52, 145, 50, 119; 53/502; 209/645, 942; 198/347.1, 465.1; 83/77
See application file for complete search history.

(56) References Cited

U.S. PATENT DOCUMENTS

| | | | |
|---|---|---|---|
| 3,954,166 A * | 5/1976 | Ives et al. | 53/502 |
| 4,397,384 A | 8/1983 | Nohren, Jr. | |
| 4,720,961 A * | 1/1988 | Jordan | 53/502 |
| 4,871,057 A | 10/1989 | Aarts | |
| 5,499,719 A | 3/1996 | Lindee et al. | |
| 5,806,287 A * | 9/1998 | Trechsel | 53/502 |
| 7,279,644 B1 * | 10/2007 | Kasel | 177/25.13 |
| 2011/0232445 A1 * | 9/2011 | Weber | 83/77 |

FOREIGN PATENT DOCUMENTS

| | | |
|---|---|---|
| DE | 4409908 A1 | 10/1994 |
| DE | 10334643 A1 | 3/2005 |
| EP | 0 893 674 A1 | 1/1999 |

OTHER PUBLICATIONS

Office Action for German Patent Application No. 10 2010 033 526.6, dated Jul. 1, 2011, 11 pgs., with English translation.
European Search Report for European Patent No. 11 00 6295, dated Oct. 28, 2011, 7 pgs. (with English translation).

* cited by examiner

Primary Examiner — Randy W Gibson
(74) Attorney, Agent, or Firm — Cantor Colburn LLP

(57) ABSTRACT

An apparatus for handling portions of products, in particular food products, having a product conveyor which conveys the portions after one another to at least one main conveyor track along a direction of conveying and having at least one sensor for recognizing portions of incorrect weight. A correction track is provided which has a first conveying section and a second conveying section. The first conveying section serves to branch off portions of incorrect weight from the main conveying track and to convey them to a weight correction station. The second conveying section serves to supply weight-corrected portions back to the main conveying track. The first conveying track and the second conveying track are separated from one another in the region of the weight correction station by an interruption of the correction track which prevents a transfer of portions of incorrect weight from the first conveying section to the second conveying section.

16 Claims, 2 Drawing Sheets

APPARATUS AND METHOD FOR HANDLING PORTIONS OF FOOD PRODUCTS

CROSS-REFERENCE TO RELATED APPLICATION(S)

This application claims priority from German Patent Application No. DE 10 2010 033 526.6, filed Aug. 5, 2010, entitled "Apparatus and Method for Handling Portions of Products," which is fully incorporated herein by reference.

SUMMARY OF THE INVENTION

The present invention relates to an apparatus for handling portions of products, in particular food products, having a product conveyor which conveys the portions after one another to at least one main conveyor track along a direction of conveying and having at least one sensor for recognizing portions of incorrect weight.

Such apparatus are used, for example, in the food industry to supply product slices cut off by a cutting apparatus, such as a high-performance slicer, portion-wise to a downstream processing apparatus, for example to a packaging machine. In particular a band conveyor or a belt conveyor can be considered as product conveyors. To ensure that only those portions are further processed which satisfy a preset weight specification, portions of incorrect weight are recognized by the sensor and, for example, are brought to a required desired weight by a manual correction. For this purpose, a corresponding operator, however, requires a certain amount of time so that ultimately the economy of the production plant is restricted by such a correction. Furthermore, on a manual correction as a consequence of an absence or lack of attention of the operator, it may occur that portions of incorrect weight are conveyed on and are finally packaged. Such a further processing of portions of incorrect weight is, however, absolutely to be avoided in food production.

It is therefore an object of the invention to provide a possibility by which portions of incorrect weight can be corrected simply and reliably.

This object is satisfied by an apparatus having the features of claim 1.

In accordance with the invention, an apparatus for handling portions of products includes a correction track having a first conveying section which serves to branch off portions of incorrect weight from the main conveying track and to convey them to a weight correction station and having a second conveying section which serves to supply weight-corrected portions back to the main conveying track, wherein the first conveying section and the second conveying section are separated from one another by an interruption of the correction track in the region of the weight correction station, said interruption preventing a transfer of portions of incorrect weight from the first conveying section to the second conveying section.

Portions recognized as being of incorrect weight are therefore branched off from the main conveying track and conducted to a separate correction track. This can take place by means of a controllable switch element such as is known in the technical area. The portions of incorrect weight are then supplied on the correction track to the weight correction station at which the first conveying section of the correction track ends. Due to the interruption of the correction track, the portions of incorrect weight are not transported away again by the weight correction station if they are not previously corrected and actively brought to the second conveying section. In the simplest case, a gap can be located between the first conveying section and the second conveying section of the correction track and is sufficiently large that an incoming portion of incorrect weight remains in the gap and does not move onto the second conveying section. The weight of the portion of incorrect weigh can now be corrected in the region of the weight correction station in that e.g. individual products are added to the portion or taken away from the portion. Depending on the application, this can take place automatically, e.g. by means of a robot, or manually by an operator. After the correction, the portion which now has a correct weight can be supplied by the robot or by the operator to the second conveying section which supplies the weight-correction portion back to the main conveying track and channels it into the regular product portion stream. The channeling in can also take place by means of a controllable switch element.

An operator has sufficient time to carry out the correction due to the conducting of all portions of incorrect weight out of the continuous product portion stream onto a separate correction track. I.e. the throughput of portions on the main conveying track is not impaired by the correction. The channeling in of the weight-corrected portions can namely take place at any desired later time. In this respect, it must in particular be noted that with modern high-performance slicers portions of incorrect weight only occur very rarely. Since the conveying process on the correction track is interrupted in a compulsory manner at the interruption, an accidental channeling back in of portions of incorrect weight into the main conveying track is precluded. In other words, a temporary lack of attention or absence of an operator or a malfunction of a correction robot is not critical since in this case only the portion of incorrect weight remains longer in the region of the weight correction station, but is not incorrectly supplied to the production process. An unwanted packaging of portions of incorrect weight is thus reliably avoided by the apparatus in accordance with the invention, with, however, the efficiency of the total plant not being impaired.

Further developments of the invention are set forth in the dependent claims, in the description and in the enclosed drawing.

In accordance with an embodiment, a buffer device for the temporary storage of portions of incorrect weight are provided in the region of the interruption. In a particularly simple embodiment, the buffer device is a product placement area which is arranged in a gap between the first conveying section and the second conveying section of the correction track. Incoming portions of incorrect weight remain on this placement area until an operator or a robot picks them up and supplies them—after a weight correction—to the second conveying section. More complex buffer systems are, however, also possible which e.g. use displaceable placement areas or shelf systems to pick up a plurality of portions of incorrect weight and to store them temporarily in an ordered fashion.

The buffer device can furthermore include a buffer conveyor which serves to transport portions of incorrect weight away from the first conveying section. In this manner, a portion jam at the end of the first conveying portion of the correction track is avoided. The buffer conveyor preferably conveys the portions transversely to the correction track. There is generally sufficient room in this direction for the conveying and/or storing of a plurality of portions of incorrect weight. An additional buffer apparatus such as a container or an additional placement area by which a portion jam is avoided even in the extreme case of a longer absence of the operator can be located at the end of the buffer conveyor. It is generally also possible that the buffer conveyor conveys the portions in the direction of the correction track provided a sufficient buffer area is provided by the buffer conveyor itself.

In accordance with a further embodiment, a placement area for at least one portion of incorrect weight is provided in the region of the weight correction station and serves as a reservoir for individual portions for the weight correction of following portions of incorrect weight. On the correction of the portions of incorrect weight, a process can therefore e.g. be followed such that the first incoming portion is placed onto the placement area and is kept ready there as a "product dispenser". A following portion of incorrect weight can now be corrected in that individual products are taken from the first portion located on the placement area and are added to the following portion of incorrect weight. One portion of incorrect weight is therefore gradually reduced to correct a plurality of following portions of incorrect weight. As soon as individual products for topping up other portions are no longer present on the placement area, the next incoming portion of incorrect weight is placed onto the placement area as a new reservoir. The advantage of this procedure is that no separate product reservoir or product supply has to be provided at the weight correction station. A further advantage is that work is carried out in accordance with the "first-in/first-out" principle. This therefore means that any unnecessarily long storage of individual products in the region of the weight correction station is avoided, which is in particular of advantage for cooling and hygienic aspects.

In accordance with an aspect of the invention, the buffer conveyor itself or a section thereof forms the placement area. The buffer conveyor can in particular be designed such that it is does not convey continuously, but only step-wise as required, e.g. only on a new portion of incorrect weight arriving at the weight correction station. The operator then, for example, in each case takes individual products from that portion which was already conveyed furthest away from the first conveying portion and added them to a further portion located on the buffer conveyor. In this case, no separate placement area for a portion serving as a reservoir has to be provided.

In accordance with a further embodiment, at least one set of scales is provided in the region of the weight correction station for determining the weight of portions of incorrect weight and/or of weight-corrected portions. An operator can thus remove individual products from a portion of incorrect weight or add individual products to it for so long until the weight of the portion lies within a preset desired range.

To simplify the work of the operator, the set of scans can display an "IO" signal when the weight of the weighed portion lies within a desired range or a "+n" signal when the addition of n individual products to the portion is required to reach the desired range or a "−n" signal when the removal of n individual products from the portion is necessary to achieve the desired range. Any desired natural number is designated by "n". If the addition of one individual product to the portion to bring the weight of the portion to a value within the desired region, e.g. "+1" is displayed. The operator thus immediately knows on the weighing of a portion how many individual products have to be removed from or added to the weighed portion. The set of scales can additionally also display the instantaneous weight of the weighed portion and/or a shortfall between the desired weight and the actual weight.

The set of scales can generally be arranged as a separate apparatus next to the correction track. In accordance with a preferred embodiment of the invention, the set of scales is, however, integrated into the second conveying section. The set of scales can in this respect output a release signal when the weight of a weight-corrected portion lies in a desired range, with the release signal automatically setting the second conveying section into operation. It is ensured in this manner that a transporting off of a portion on the second conveying sections can only take place when the weight of the portion lies within the preset desired range. Since the set of scales itself sets the second conveying section in motion, the work of the operator is further simplified.

In accordance with a further embodiment of the invention, the correction track is arranged in the region of a buffer section of the main conveying track. This is advantageous to the extent that with such an arrangement, that time can be used to channel weight-corrected portions back into the product portion stream at which the buffer section changes between two buffer regions, e.g. from one buffer plane to another buffer plane. The product conveying process on the main conveying track is thus not impaired by the channeling in of the weight-corrected portions.

A detection apparatus can be arranged at the product conveyor disposed after the correction track in the conveying direction to detect the position of the conveyed portions, in particular of the weight-corrected portions, on the main conveying track. The detection apparatus can be an optical sensor, in particular a camera system. If individual weight-corrected portions are not exactly positioned, this is detected by the detection apparatus and reported e.g. to a higher-ranking control device. The position of the incorrectly positioned portions can then be taken into account in the further handling or a handling apparatus such as a robot can be provided separately to correct the position automatically.

The invention also relates to a method of handling portions of products, in particular food products, wherein the portions are conveyed after one another to at least one main conveying track along a conveying direction and portions of incorrect weight are recognized by means of a sensor.

In accordance with the invention, portions of incorrect weight are branched off from the main conveying track by means of a first conveying section of a correction track and are conveyed to a weight correction station. Weight-corrected portions are supplied back to the main conveying track on a second conveying section of the correction track, wherein a transfer of portions of incorrect weight from the first conveying section to the second conveying section is prevented.

At least one individual product is preferably removed from the portion of incorrect weight or added to the portion of incorrect weight for weight correction. The removal and/or addition of individual products can take place manually or automatically depending on the application.

In accordance with an embodiment, a first portion of incorrect weight is used as a reservoir for individual products for the weight correction of following portions of incorrect weight.

BRIEF DESCRIPTION OF THE DRAWINGS

The invention will be described in the following by way of example with reference to the drawing.

DETAILED DESCRIPTION

Figure 1:
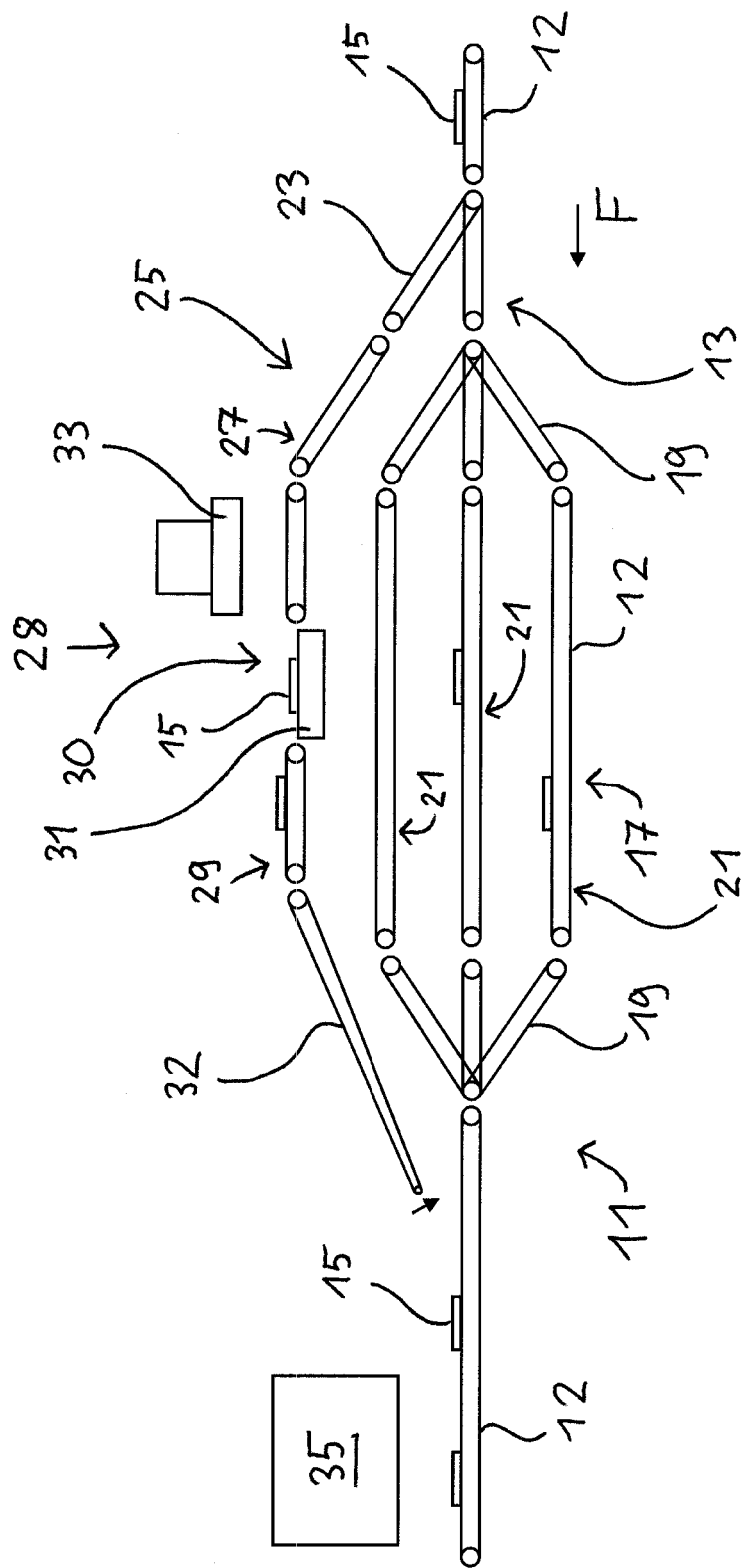
FIG. 1 shows a simplified side view of an apparatus in accordance with the invention for handling portions of products.

An apparatus in accordance with the invention for handling portions 15 of food products such as slices of meat, sausage or cheese is shown in FIG. 1. A slicer, not shown, separates individual product slices 14 (FIG. 2) from a product loaf at high speed, said individual product slices falling onto a product conveyor 11 and being conveyed by it along a conveying direction F. The product conveyor 11 in the embodiment shown is composed of a plurality of individual band conveyors 12 which together form a main conveying track 12. A control device, not shown, of the slicer and/or of the product conveyor 11 provides that a plurality of cut-off product slices 14 in each case form a portion 15.

The main conveying track 13 has a buffer section 17 in which portions 15 incoming by means of a controllable multi-track rocker 19 are supplied to a respective one of three parallel buffer tracks 21. The three buffer tracks 21 are combined to a single track again at the end of the buffer section 17 by means of a further multi-track rocker 19. The buffer section 17 can in particular serve to vary the product throughput of the product conveyor 11 as required.

The portions 15 conveyed on the product conveyor 11 are checked with respect to their weight by means of a sensor, not shown, before the entry into the buffer section 17, i.e. it is detected whether the portion weight lies within a preset desired range. If a portion of incorrect weight 15 is recognized, the portion is branched off from the main conveying track 13 by means of a further controllable multi-track rocker 23 and is supplied to a correction track 25. The correction track 25 is likewise composed of a plurality of individual band conveyors 12 and includes a first conveying section 27 which leads from the main conveying track 13 up to a weight correction station 28 as well as a second conveying section 29 which leads from the weight correction station 28 back to the main conveying track 13. Portions 15 of incorrect weight are therefore channeled out of the normal processing procedure on the correction track 25, are corrected at a weight correction station and are finally channeled back into the processing procedure.

As can be seen from FIG. 1, the first conveying section 27 and the second conveying section 29 of the correction track 25 are separated from one another by a gap or by an interruption 30. A buffer device 31 which is designed as a simple product placement area in the embodiment shown is located in the interruption 30. A portion 15 arriving at the weight correction station 28 on the first conveying section 27 moves onto the buffer device 31 and remains lying there, i.e. no transfer of the portion 15 from the first conveying section 27 to the second conveying section 29 can take place. An operator at the weight correction station 28 has to correct the portion manually and then to place it onto a corresponding band conveyor 12 of the second conveying section 29 so that it can be conveyed further and supplied back to the main conveyor track 13. The channeling into the main conveying track 13 takes place by means of a pivotable rocker 32. That time can advantageously be used for the channeling in process at which a switch is made in the buffer section 17 from one of the buffer tracks 21 to another buffer track 21. The channeling back in of weight-corrected portions 15 after an adjustable time can generally take place after an adjustable number of corrected portions 15 or on demand by the operator.

A set of scales 33 is provided in the region of the weight correction station 28 to enable the operator to determine the weight of portions 15 of incorrect weight or weight-corrected portions. The operator can correct the weight of a portion 15 of incorrect weight in that he adds individual product slices 14 to the portion 15 or removes them from the portion 15. After the correction, the corrected portion 15 is, as described above, conveyed back to the main conveying track 13 again on the second conveying section 29 of the correction track 25 and is channeled into said main conveying track by means of the rocker 32.

A detection apparatus 35 is arranged downstream of the correction track 25 in the conveying direction F at the product conveyor 11 to detect the positions of the weight-corrected portions 15 on the main conveying track 13. The detected position can be used to control a further handling apparatus, not shown, in the sense of an automatic positional correction of the portions 15. Alternatively, the detected position can be advised to a handling apparatus which, for example, transfers the portions 15 into a packaging machine in order thus to ensure a reliable transfer.

Figure 2:
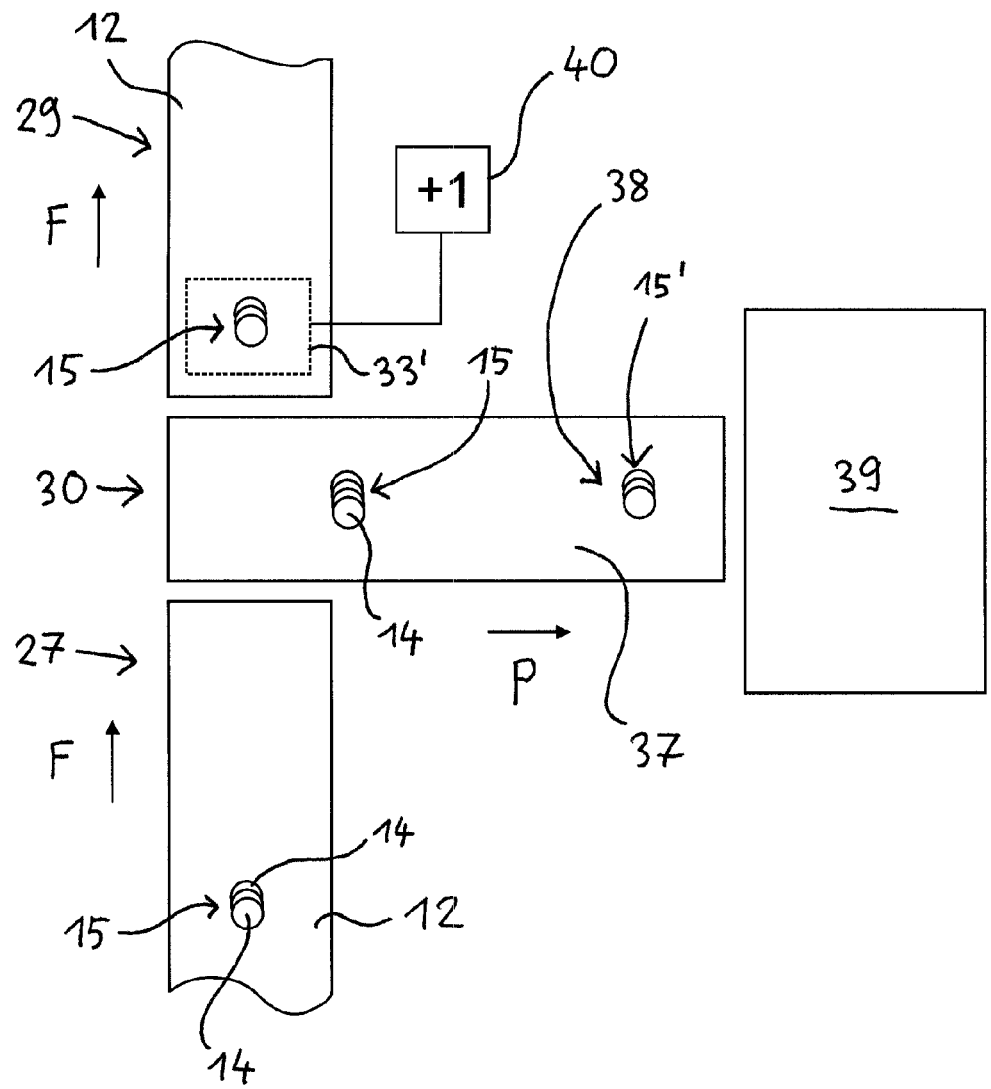
FIG. 2 shows a plan view of a weight correction station of an apparatus for handling portions of products in accordance with an alternative embodiment to the apparatus in accordance with FIG. 1.

The buffer device 31, which serves for the temporary storage of portions 15 of incorrect weight, can be designed in a variety of ways. FIG. 2 shows an embodiment in which the buffer device 31 includes a buffer conveyor 37 which serves to transport portions of incorrect weight away in a buffer direction P facing transversely to the conveying direction F of the correction track 25 from the first conveying section 27. A container 39 is arranged at the end of the buffer conveyor 37, said container forming an additional buffer apparatus and being provided by way of security to accept any portions 15 conveyed beyond the end of the buffer conveyor 37.

The set of scales 33' is integrated into a band conveyor 12 of the second conveying section 29 in the embodiment in accordance with FIG. 2. It has a display 40 which displays an "IO" signal, a "+n" signal or a "−n" signal in dependence on the weight of a weighed portion. A "+1" signal indicates to an operator at the weight correction station 28, for example, that a still further individual product slice 14 is to be added to the weighed portion so that the portion weight lies within a desired range. In a similar manner, a "−1" signal provides the operator with the knowledge that a product slice 14 has to be removed from the weighed portion 15 so that the portion weight lies within the desired range. The "IO" signal, in contrast, indicates that the weighed portion 15 already has a weight lying below the desired range and can again be supplied to the main conveying track 13 (FIG. 1). In the embodiment shown, the set of scales 33' is connected to a control device, not shown, of the second conveying section 29 and outputs, simultaneously with the display of the "IO" signal, a release signal to the control device which automatically sets the band conveyors 12 of the second conveying section 29 into operation.

On arrival of a portion 15 of incorrect weight at the weight correction station 28, it first moves from the first conveying section 27 to the buffer conveyor 37. This is operated so that a respective limited further conveying by a preset amount takes place on each newly arriving portion 15 of incorrect weight. The portions 15 of incorrect weight 15 are therefore intermediately stored following one another on the buffer conveyor 37, wherein the portion 15 arriving first is located at the position disposed furthest to the right in the drawing. This first arriving portion 15' is used by the operator as a reservoir for individual product slices 14 and remains on the buffer conveyor 37 which thus forms a placement area 38 for the portion 15' arriving first. The next following portion 15 of incorrect weight is placed by the operator onto the set of scales 33' which is integrated in the second conveying section 29 and which outputs an "IO" signal, a "+n" signal or a "−n" signal in dependence on the determined portion weight. If the set of scales 33' outputs, as shown, a "+1" signal, the operator removes an individual product slice 14 from the portion 15 arriving first and places it onto the portion 15 which is located on the set of scales 33'. The weight of the portion 15 now lies within the preset desired range and the set of scales 33' therefore outputs an "IO" signal. At the same time, the set of scales 33' also outputs a release signal to a control device of the correction track 25 which automatically sets the band conveyor 12 of the second conveying section 29 into operation. The weight-corrected portion 15 is then, as described in connection with FIG. 1, transported back to the main conveyor track 13 again on the second conveying section 29 and is channeled into the regular product flow there. When the portion 15' which arrives first and which serves as a reservoir is consumed, the portion 15 of incorrect weight arriving next is in turn left on the buffer conveyor 37 and is used as a dispenser for individual product slices 14. It is prevented in this manner that a separate static product slice reservoir has to be provided in which there is in particular the danger that the individual product slices 14 are stored uncooled for an unpermitted time.

The invention in particular enables a simple and reliable correction of slices of incorrect weight, wherein an impairment of the regular conveying and handling process is avoided.

REFERENCE NUMERAL LIST 11 product conveyor
12 band conveyor
13 main conveying track
14 product slice
15, 15' portion
17 buffer section
19 multi-track rocker
21 buffer track
23 multi-track rocker
25 correction track
27 first conveying section
28 weight correction station
29 second conveying section
30 interruption
31 buffer device
32 rocker
33, 33' set of scales
35 detection apparatus
37 buffer conveyor
38 placement area
39 container
40 display
F conveying direction
P buffering direction

What is claimed is:

1. An apparatus for handling portions (15) of products (14), having a product conveyor (11) which conveys the portions (15) after one another on at least one main conveying track (13) along a conveying direction (F); and at least one sensor for recognizing portions (15) of incorrect weight, wherein a correction track (25) has a first conveying section (27) which serves to branch off portions (15) of incorrect weight from the main conveying track (13) and to convey them to a weight correction station (28) and has a second conveying section (29) which serves to supply weight-corrected portions (15) back to the main conveying track (13), with the first conveying section (27) and the second conveying section (29) being separated from one another in the region of the weight correction station (28) by an interruption (30) of the correction track (25) which prevents a transfer of portions (15) of incorrect weight from the first conveying section (27) to the second conveying section (29).

2. An apparatus in accordance with claim 1, wherein a buffer device (31) is provided in the region of the interruption (30) for the temporary storage of portions (15) of incorrect weight.

3. An apparatus in accordance with claim 2, wherein the buffering device (31) includes a buffer conveyor (37) which serves to transport portions (15) of incorrect weight away from the first conveying section (27).

4. An apparatus in accordance with claim 1, wherein a placement area (38) for at least one portion (15) of incorrect weight is provided in the region of the weight correction station (28) and serves as a reservoir of individual products (14) for the weight correction of following portions (15) of incorrect weight.

5. An apparatus in accordance with claim 3, wherein the buffer conveyor (37) or a section thereof forms a placement area (38).

6. An apparatus in accordance with claim 4, wherein the buffer conveyor (37) or a section thereof forms a placement area (38).

7. An apparatus in accordance with claim 1, wherein at least one set of scales (33, 33') is provided in the region of the weight correction station (28) for determining the weight of portions (15) of incorrect weight and/or weight-corrected portions.

8. An apparatus in accordance with claim 7, wherein the set of scales (33') displays an "IO" signal when the weight of the weighed portion (15) lies within a desired range; or
displays a "+n" signal when the addition of n individual products (14) to the portion (15) is required to achieve the desired range;
or displays a "−n" signal when the addition of n individual products (14) to the portion (15) is required to achieve the desired range.

9. An apparatus in accordance with claim 7, wherein the set of scales (33') is integrated into the second conveying section (29).

10. An apparatus in accordance with claim 7, wherein the set of scales (33') outputs a release signal when the weight of a weight-corrected portion (15) lies in a desired range, with the release signal automatically setting the second conveying section (29) into operation.

11. An apparatus in accordance with claim 1, wherein the correction track (25) is arranged in the region of a buffer section (17) of the main conveying track (13).

12. An apparatus in accordance with claim 1, wherein a detection apparatus is arranged disposed after the correction track (25) in the conveying direction (F) at the product conveyor (11) to detect the position of the conveyed portions (15) on the main conveying track (13).

13. An apparatus in accordance with claim 1, wherein a detection apparatus is arranged disposed after the correction track (25) in the conveying direction (F) at the product conveyor (11) to detect the position of the conveyed weight-corrected portions (15) on the main conveying track (13).

14. A method of handling portions (15) of products (14), wherein the portions (15) are conveyed after one another on at least one main conveying track (13) along a conveying direction (F) and portions (15) of incorrect weight are recognized by means of a sensor,
wherein portions (15) of incorrect weight are branched off from the main conveying track (13) by means of a first conveying section (27) and are conveyed to a weight correction station (28); and
weight-corrected portions (15) are supplied back to the main conveying track (13) on a second conveying section (29) of the correction track (25), with a transfer of portions (15) of incorrect weight from the first conveying section (27) to the second conveying section (29) being prevented by means of an interruption (30) of the correction track (25).

15. A method in accordance with claim 14, wherein an individual product (14) is removed from the portion (15) of incorrect weight or is added to the portion (15) of incorrect weight for weight correction.

16. A method in accordance with claim 14, wherein a first portion (15') of incorrect weight is used as a reservoir for individual products (14) for the weight correction of following portions (15) of incorrect weight.

\* \* \* \* \*